US012343579B2

(12) United States Patent
Lee

(10) Patent No.: US 12,343,579 B2
(45) Date of Patent: Jul. 1, 2025

(54) SMART FIRE-EXTINGUISHING DEVICE AND SMART FIRE-EXTINGUISHING SYSTEM INCLUDING SAME

(71) Applicant: Jung Woo Lee, Seoul (KR)

(72) Inventor: Jung Woo Lee, Seoul (KR)

( * ) Notice: Subject to any disclaimer, the term of this patent is extended or adjusted under 35 U.S.C. 154(b) by 619 days.

(21) Appl. No.: 17/636,984

(22) PCT Filed: Aug. 19, 2020

(86) PCT No.: PCT/KR2020/011012
§ 371 (c)(1),
(2) Date: Feb. 21, 2022

(87) PCT Pub. No.: WO2021/034092
PCT Pub. Date: Feb. 25, 2021

(65) Prior Publication Data
US 2022/0355147 A1 Nov. 10, 2022

(30) Foreign Application Priority Data
Aug. 19, 2019 (KR) ........................ 10-2019-0101060

(51) Int. Cl.
*A62C 37/40* (2006.01)
*A62C 3/02* (2006.01)
(Continued)

(52) U.S. Cl.
CPC ............ *A62C 37/40* (2013.01); *A62C 3/0271* (2013.01); *A62C 3/0292* (2013.01); *A62C 37/46* (2013.01); *G08B 17/10* (2013.01)

(58) Field of Classification Search
CPC ....... A62C 19/00; A62C 37/40; A62C 3/0271; A62C 3/0292; A62C 37/46;
(Continued)

(56) References Cited

U.S. PATENT DOCUMENTS 6,164,383 A * 12/2000 Thomas ................. A62C 37/36 169/61
6,184,792 B1 * 2/2001 Privalov ................ F23N 5/082 700/274
(Continued)

FOREIGN PATENT DOCUMENTS

JP 3994355 10/2007
KR 10-1300328 8/2013
(Continued)

OTHER PUBLICATIONS

International Search Report dated Nov. 3, 2020 in International Patent Application No. PCT/KR2020/011012.
(Continued)

*Primary Examiner* — Arthur O. Hall
*Assistant Examiner* — Juan C Barrera
(74) *Attorney, Agent, or Firm* — Bridgeway IP Law Group, PLLC; Jihun Kim

(57) ABSTRACT

The present invention relates to: a smart fire-extinguishing device for automatically performing a fire-extinguishing operation by detecting the outbreak of a fire; and a smart fire-extinguishing system including same, and provides a smart fire-extinguishing device comprising: a chemical storage part in which fire-extinguishing chemicals are filled; a fuse part for exhibiting explosive force so that the fire-extinguishing chemicals of the chemical storage part are jetted to the outside; and a fire detection part, which detects at least one from among temperature, flames and smoke, compares a detection result with a pre-set fire outbreak reference value so as to determine whether a fire breaks out, and operates the fuse part according to a determination result so as to jet out the fire-extinguishing chemicals.

6 Claims, 11 Drawing Sheets

(51) Int. Cl.
*A62C 37/46* (2006.01)
*G08B 17/10* (2006.01)

(58) Field of Classification Search
CPC ............ G08B 17/00–125; G08B 23/00; G08B 21/00–245; G08B 31/00
USPC ........................................................... 169/61
See application file for complete search history.

(56) References Cited

U.S. PATENT DOCUMENTS

| | | | | |
|---|---|---|---|---|
| 2012/0061109 | A1* | 3/2012 | Pavesi | A62C 17/00<br>169/46 |
| 2014/0244549 | A1* | 8/2014 | Hodgin | G06N 5/045<br>706/14 |
| 2016/0271434 | A1* | 9/2016 | Dusing | H04L 67/12 |
| 2017/0333738 | A1* | 11/2017 | Hernandez Reina | A62C 3/025 |
| 2018/0318622 | A1* | 11/2018 | Miller | G06N 5/022 |
| 2019/0344109 | A1* | 11/2019 | Enk | A62C 37/04 |
| 2020/0159397 | A1* | 5/2020 | Tohidi | G06F 3/04847 |

FOREIGN PATENT DOCUMENTS

| | | |
|---|---|---|
| KR | 10-2013-0121490 | 11/2013 |
| KR | 101792766 | 11/2017 |
| KR | 10-1955973 | 3/2019 |

OTHER PUBLICATIONS

Written Opinion of the International Searching Authority dated Nov. 3, 2020 in International Patent Application No. PCT/KR2020/011012.

* cited by examiner

[FIG. 1]
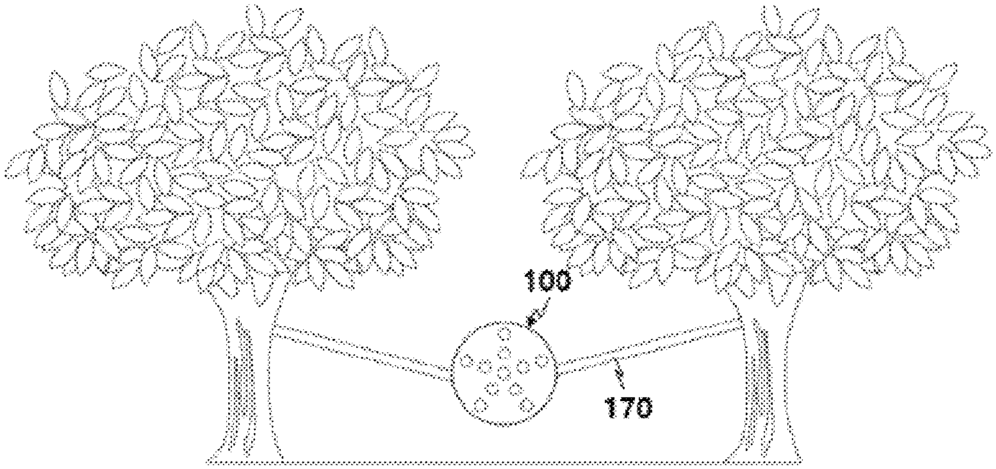
[FIG. 2]
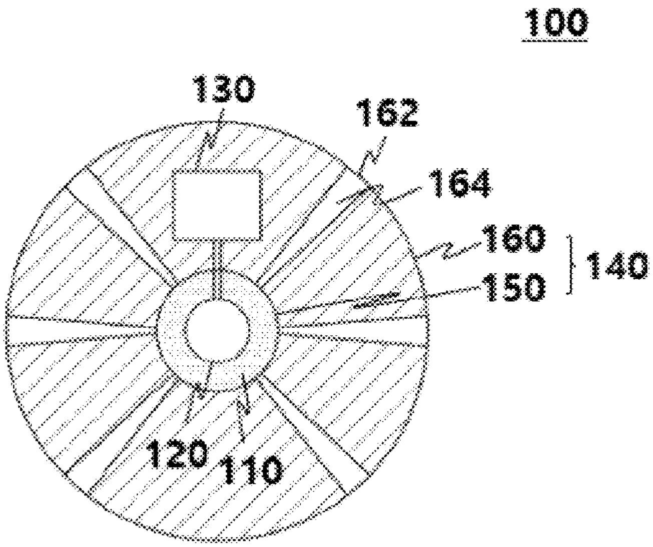

[FIG. 3]
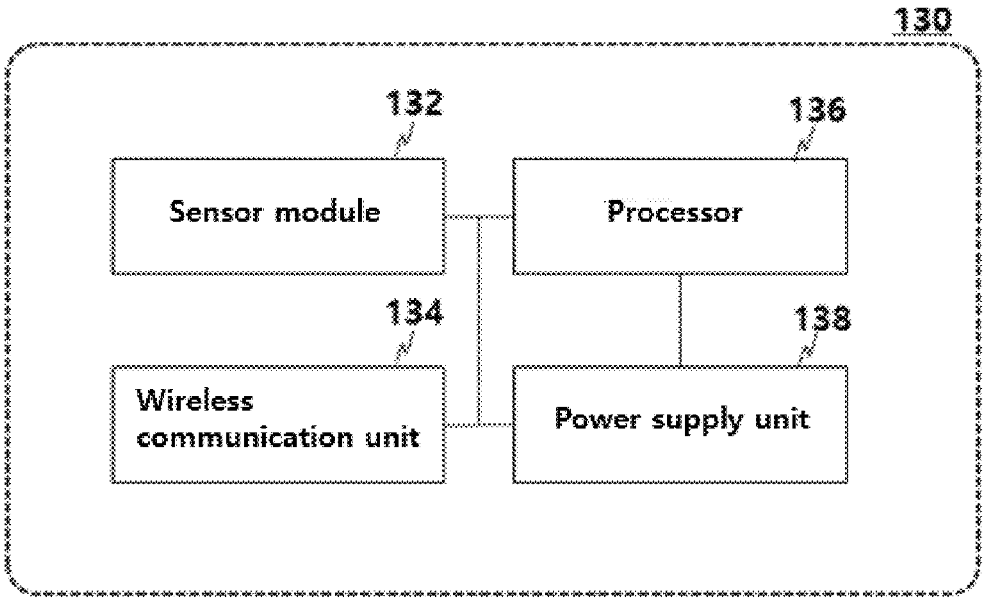

[FIG. 4]
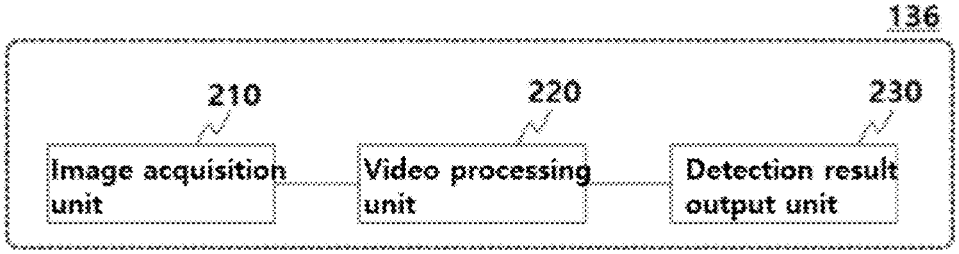
[FIG. 5]
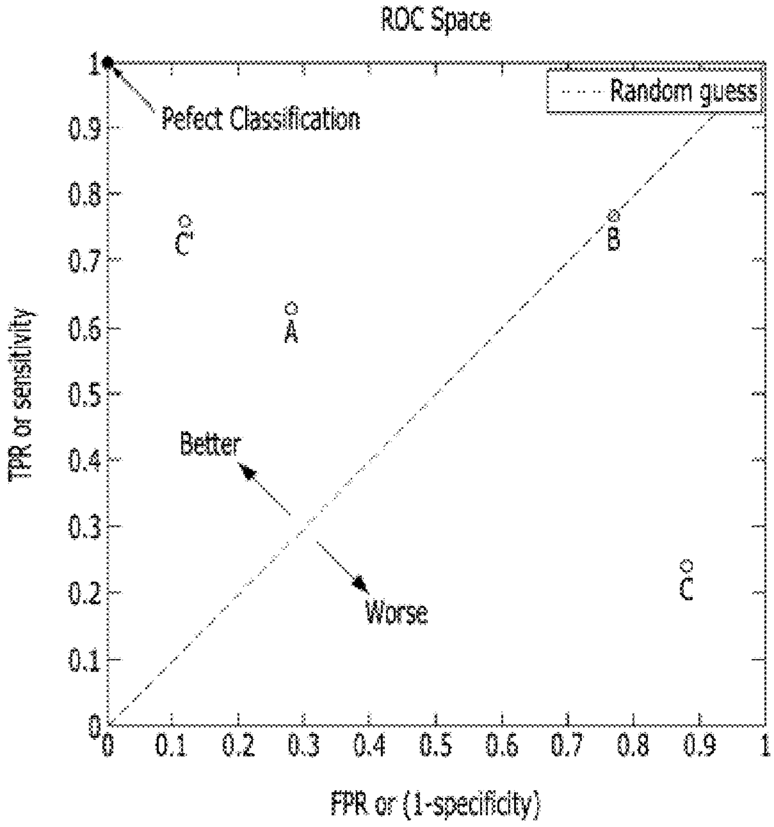

[FIG. 6]
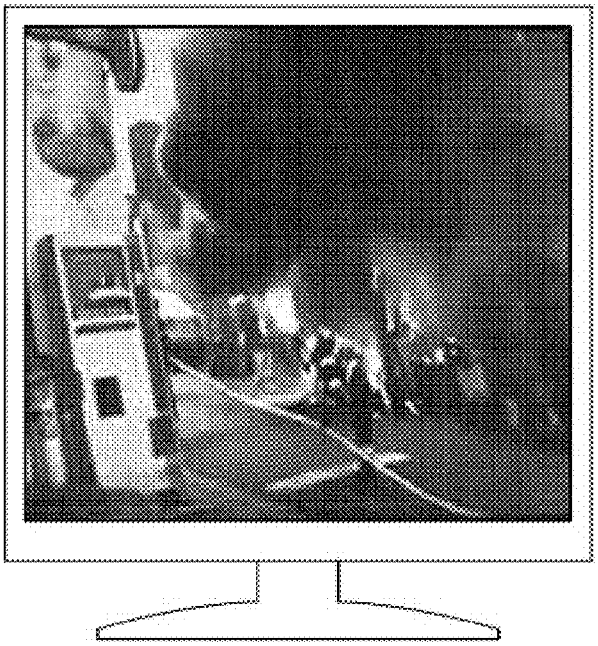
[FIG.7]
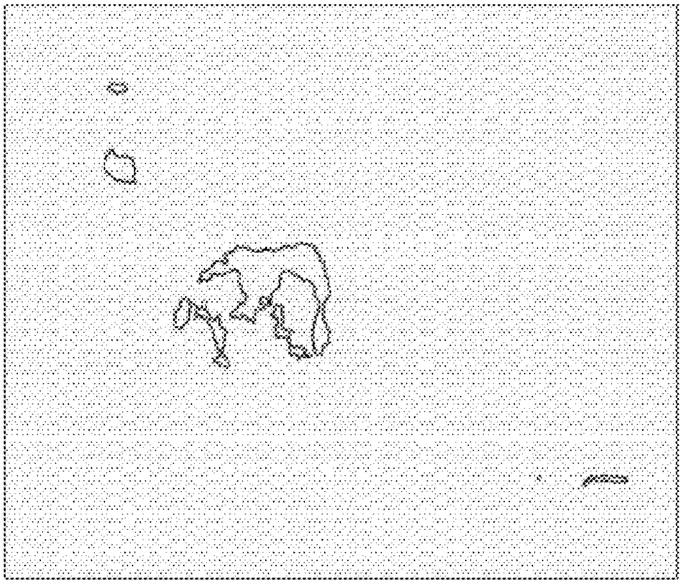

[FIG. 8]
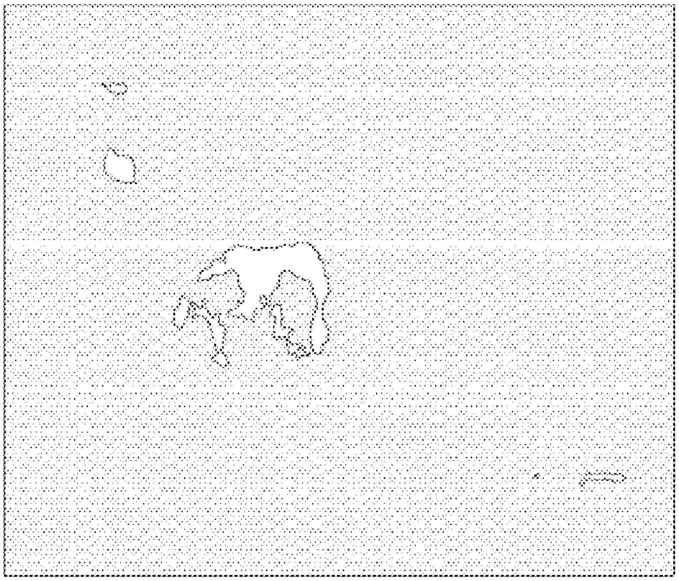
[FIG.9]
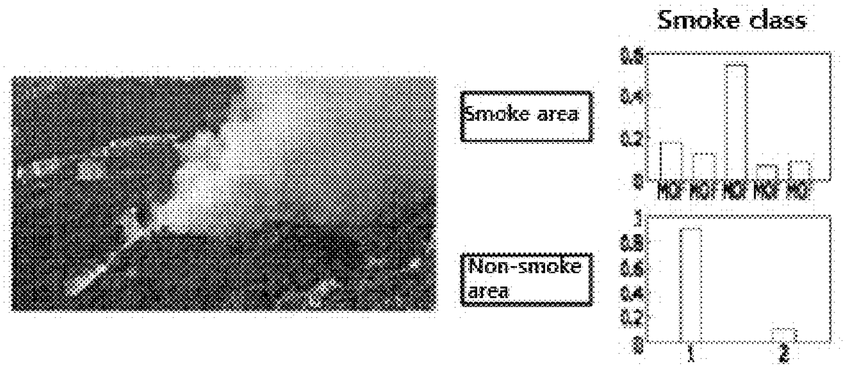

[FIG. 10]
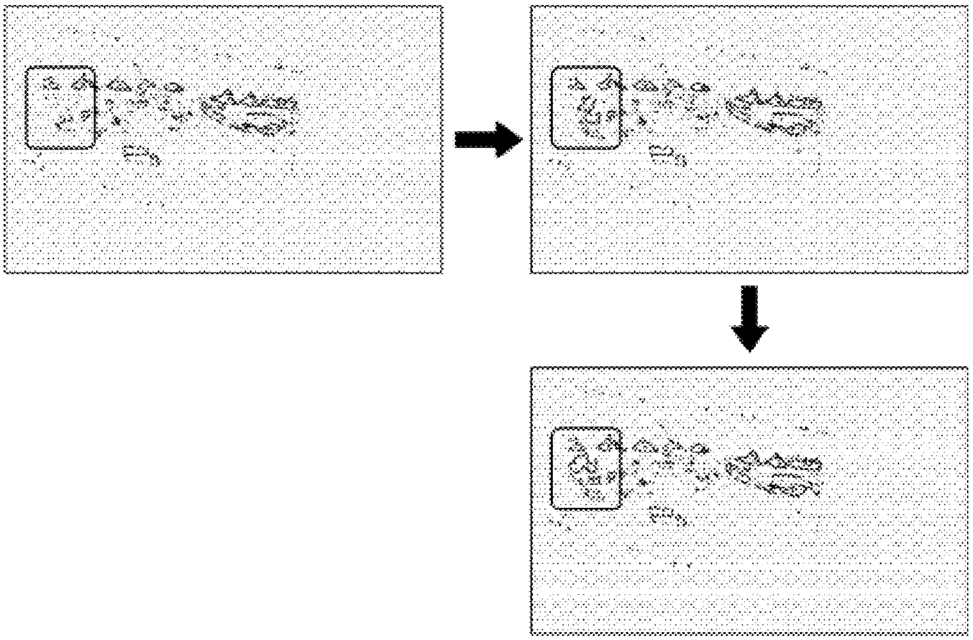

[FIG. 11]
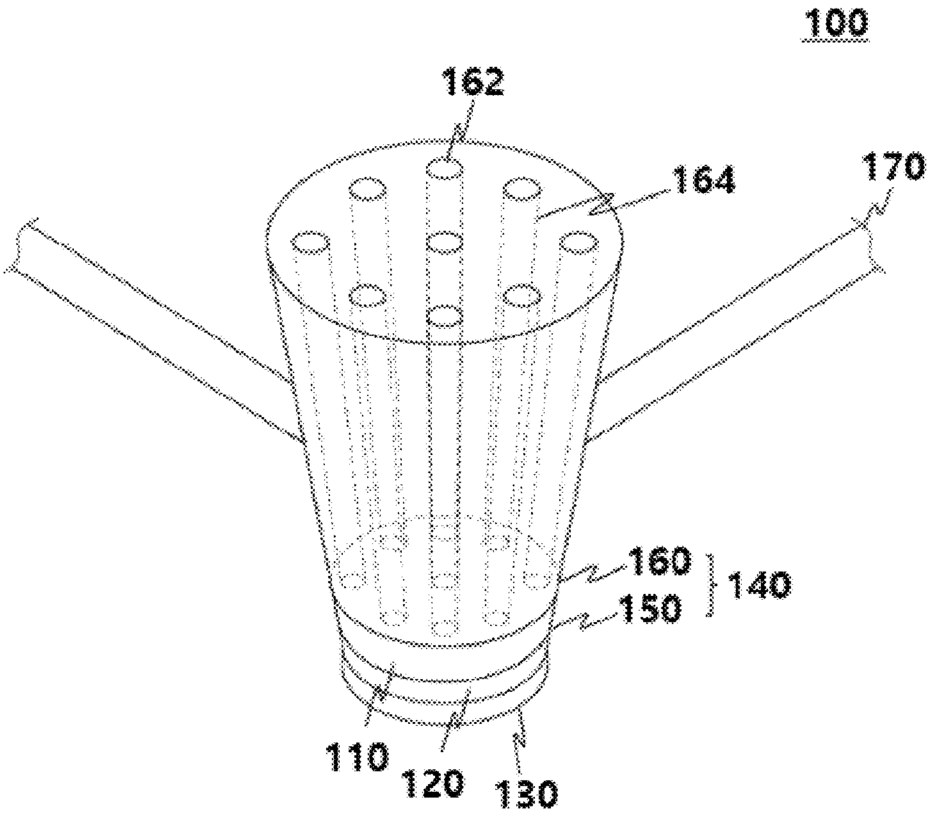
[FIG. 12]
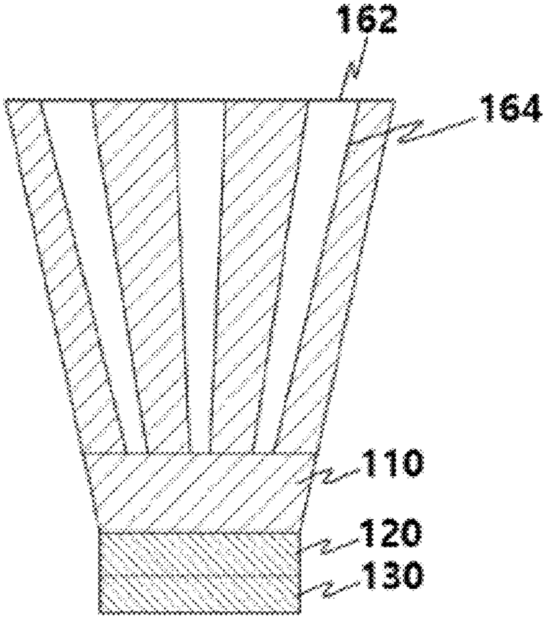

[FIG. 13]
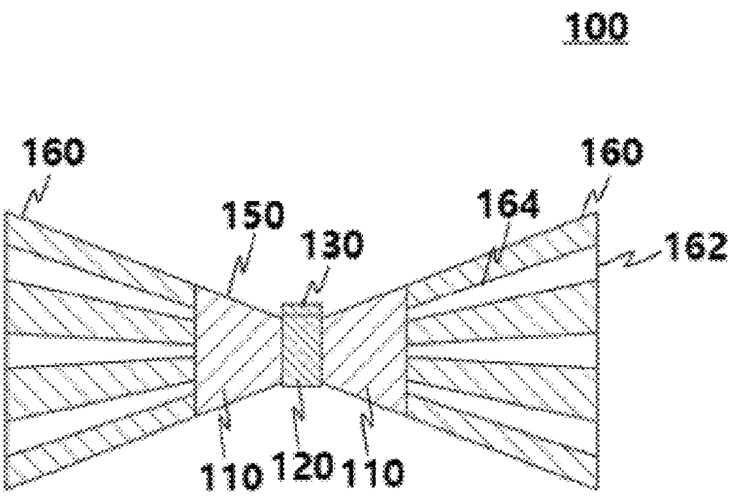
[FIG. 14]
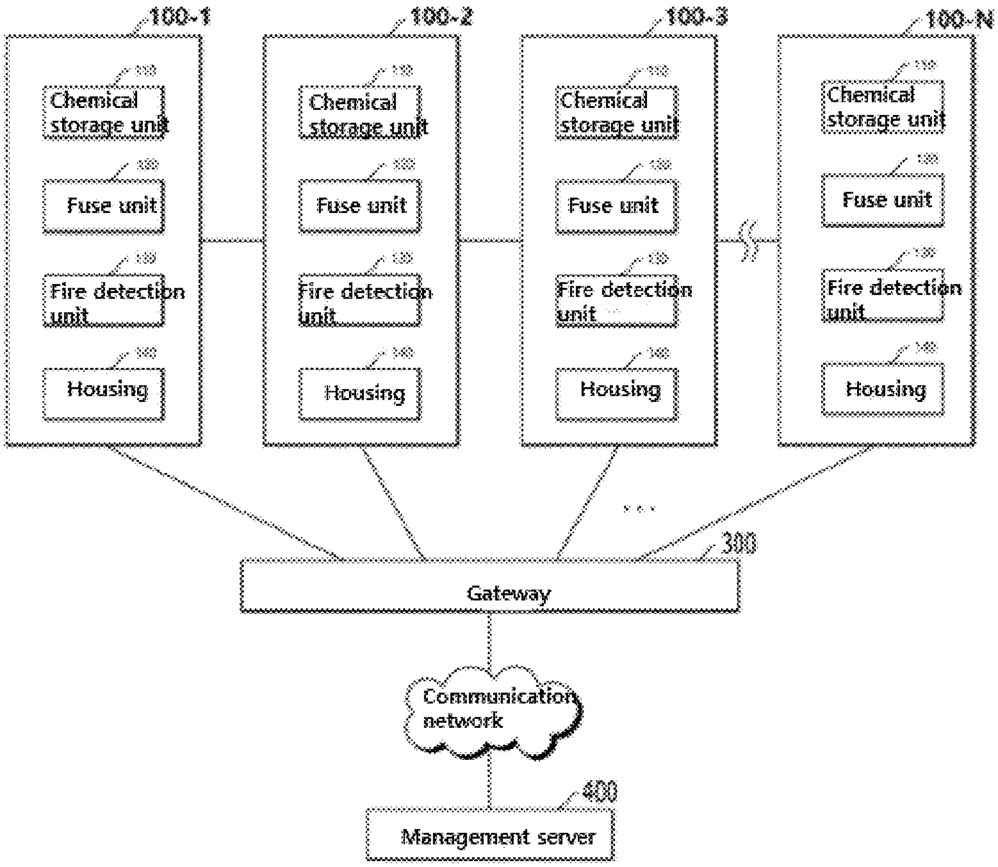

[FIG.15]
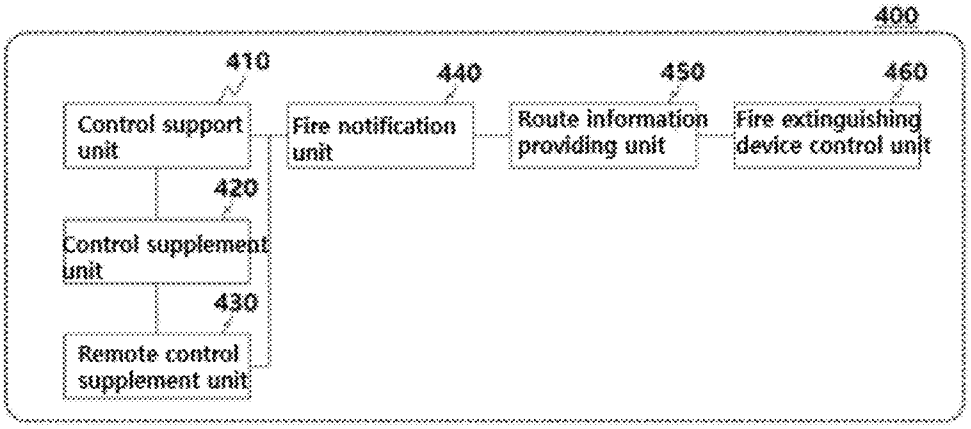
[FIG. 16]
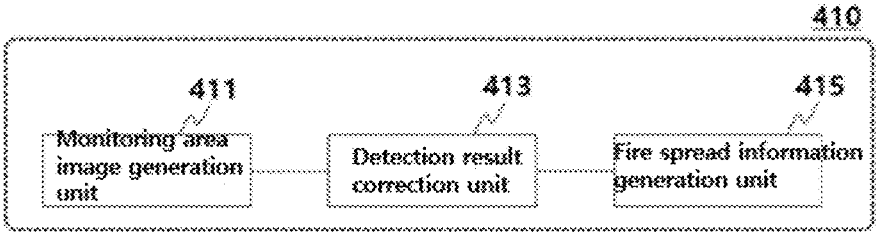

[FIG. 17]
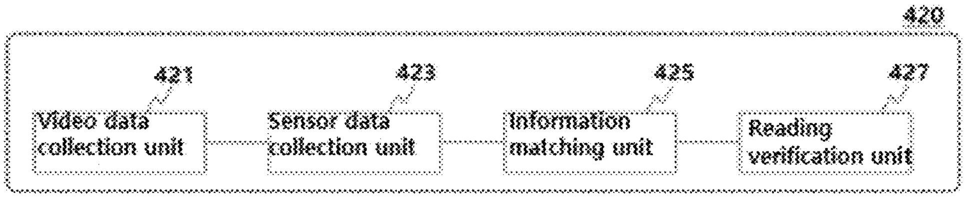
[FIG. 18]
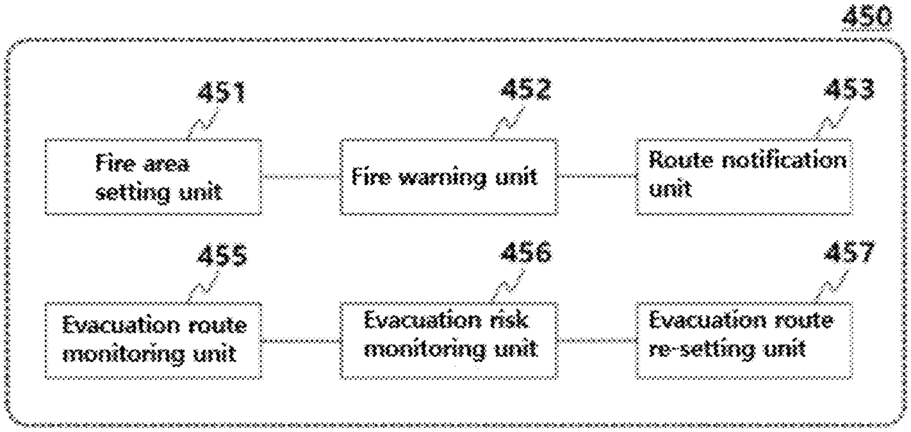

[FIG. 19]
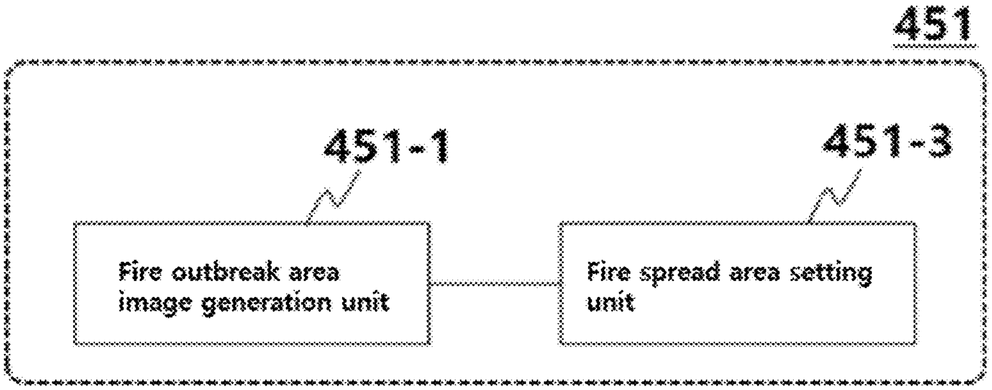
[FIG. 20]
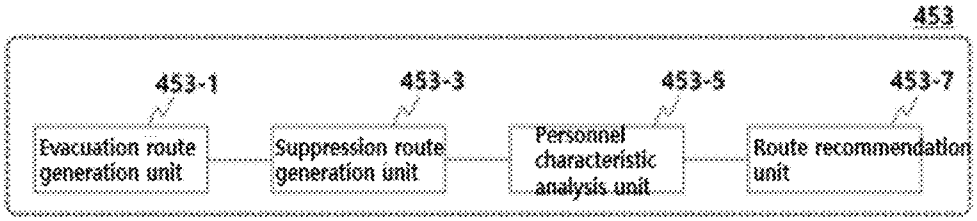

SMART FIRE-EXTINGUISHING DEVICE AND SMART FIRE-EXTINGUISHING SYSTEM INCLUDING SAME

TECHNICAL FIELD

The present invention relates to a smart fire extinguishing device and a smart fire extinguishing system including same, more specifically, to a smart fire extinguishing device for automatically performing fire extinguishing work by detecting outbreak of a fire, and a smart fire extinguishing system including same.

BACKGROUND ART

Generally, when a fire such as a forest fire breaks out, the fire is suppressed by spraying fire extinguishing liquid in the air using a helicopter or through a water spraying operation according to construction of a firebreak line of firefighters. After that, when the forest fire subsides to a predetermined level, a large amount of manpower is put in the site to extinguish the forest fire and treat residual fire, and conventionally, fire extinguishing work has been carried out using equipment such as shovels or pickaxes.

However, firefighting work using equipment such as shovels or pickaxes has a problem in that it cannot be a fundamental firefighting method due to delayed firefighting as fire extinguishing efficiency is very poor while consuming a lot of manpower and time due to the nature of the work.

DISCLOSURE OF INVENTION

Technical Problem

Therefore, the present invention has been made in view of the above problems, and it is an object of the present invention to provide a smart fire extinguishing device and a smart fire extinguishing system including the same, which can perform fire extinguishing work by automatically spurting a fire extinguishing agent when outbreak of a fire is detected.

In addition, another object of the present invention is to provide a smart fire extinguishing device and a smart fire extinguishing system including the same, which can spurt a fire extinguishing agent in a set direction and/or range by adjusting arrangement of a plurality of spurt holes and nozzles.

In addition, another object of the present invention is to provide a smart fire extinguishing device and a smart fire extinguishing system including the same, which can improve convenience of decision-making by creating an image of a fire outbreak area by associating map information and/or drawing information of a building structure, and supporting decision-making on whether a fire breaks out using a display means.

In addition, another object of the present invention is to provide a smart fire extinguishing device and a smart fire extinguishing system including the same, which can improve accuracy of fire detection information by correcting a fire detection result by reflecting environmental information on the inside and outside of a fire outbreak area.

In addition, another object of the present invention is to provide a smart fire extinguishing device and a smart fire extinguishing system including the same, which can predict a direction of fire spread, and reduce additional damage caused by fire spread by providing additional control support.

In addition, another object of the present invention is to provide a smart fire extinguishing device and a smart fire extinguishing system including the same, which can increase accuracy of fire detection by matching and verifying sensor data and video data.

In addition, another object of the present invention is to provide a smart fire extinguishing device and a smart fire extinguishing system including the same, which can calculate effective fire evacuation routes and/or fire suppression routes by classifying fire outbreak areas and fire spread areas by associating map information and/or drawing information of a building structure.

In addition, another object of the present invention is to provide a smart fire extinguishing device and a smart fire extinguishing system including the same, which can improve accuracy of predicting fire spread by setting a fire spread area based on a fire class, wind direction, and wind speed.

In addition, another object of the present invention is to provide a smart fire extinguishing device and a smart fire extinguishing system including the same, which can provide differentiated information by classifying personnel in a monitoring area.

In addition, another object of the present invention is to provide a smart fire extinguishing device and a smart fire extinguishing system including the same, which can monitor evacuation routes and fire spread in real-time, set safe evacuation routes and effective suppression routes, and provide the routes to evacuees and/or suppressors.

In addition, another object of the present invention is to provide a smart fire extinguishing device and a smart fire extinguishing system including the same, which can prevent spread of fire by operating the smart fire extinguishing system arranged in a fire spread area.

It may be understood that the technical problems to be solved by the present invention are not limited to the technical problems mentioned above, and other unmentioned technical problems can be clearly understood by those skilled in the art from the description below.

Technical Solution

To accomplish the above objects, according to one aspect of the present invention, there is provided a smart fire extinguishing device comprising: a chemical storage unit filled with a fire extinguishing agent; a fuse unit exhibiting an explosive force so that the fire extinguishing agent filled in the chemical storage unit may be spurted to the outside; and a fire detection unit for detecting at least one among temperature, flame, and smoke, determining whether a fire breaks out by comparing a detection result with a preset fire outbreak reference value, and spurting the fire extinguishing agent by operating the fuse unit according to a result of the determination.

In an embodiment of the present invention, the fire detection unit may include: a sensor module for detecting at least one among temperature, flame, and smoke; a wireless communication unit for transmitting detection information of the sensor module to an external device; a processor for controlling the sensor module, the wireless communication unit, and a power supply unit, and determining outbreak of a fire by comparing the detection information of the sensor module with the fire outbreak reference value; and the power supply unit for supplying power to the sensor module, the wireless communication unit, and the processor.

In an embodiment of the present invention, the sensor module may include: at least one among a temperature sensor for sensing temperature, a flame sensor for sensing ultraviolet and/or infrared rays emitted from flames; a smoke sensor for sensing smoke particles contained in the air; and a video monitoring device for monitoring flames and/or smoke using video detection.

In an embodiment of the present invention, the processor may include: an image acquisition unit for acquiring a video image from a video data, and dividing the video image into a plurality of blocks; a video processing unit for detecting a flame area and/or a smoke area from the video image divided into the plurality of blocks; and a detection result output unit for calculating the areas and/or the number of detected flame areas and/or smoke areas, comparing the calculated areas and/or number of detected flame areas and/or smoke areas with a fire outbreak reference value, and outputting a result of detecting a fire sign as a result of the comparison.

In an embodiment of the present invention, when the sensor module detects at least one among temperature, flame, and smoke, the processor may change an operation mode of the power supply unit from a standby mode to an active mode, and transmit the detection information to other fire detection units in the neighborhood, and the detection information may include node information of the fire detection unit and time information about when the wireless communication unit is activated.

In an embodiment of the present invention, the smart fire extinguishing device may include a housing for accommodating the chemical storage unit, the fuse unit, and the fire detection unit, and including at least one spurt hole through which the extinguishing agent and/or the chemical storage unit is spurted.

In an embodiment of the present invention, the housing may include: a first accommodation unit for accommodating the chemical storage unit and/or the fuse unit; and a second accommodation unit connected to the first accommodation unit and provided with a nozzle that connects the spurt holes and the chemical storage unit and provides a moving passage of the extinguishing agent.

According to another aspect of the present invention, there is provided a smart fire extinguishing system comprising: at least one smart fire extinguishing device arranged in a set monitoring area to detect fire and perform fire extinguishing work; and a management server for receiving detection information of the smart fire extinguishing device for each monitoring area, generating control information, and notifying the control information to the manager, wherein the smart fire extinguishing device includes: a chemical storage unit filled with a fire extinguishing agent; a fuse unit exhibiting an explosive force so that the fire extinguishing agent filled in the chemical storage unit may be spurted to the outside; and a fire detection unit for detecting at least one among temperature, flame, and smoke, determining whether a fire breaks out by comparing a detection result with a preset fire outbreak reference value, and spurting the fire extinguishing agent by operating the fuse unit according to a result of the determination.

In an embodiment of the present invention, the system further comprises a gateway for receiving detection information from a plurality of smart fire extinguishing devices and transmitting the detection information to the management server, wherein the management server generates control information by reflecting the detection information received from the gateway, gives a notification and a warning of fire in a monitoring space and/or a monitoring area where outbreak of a fire is confirmed, sets an optimal fire evacuation route, and provides evacuees with the set information.

In an embodiment of the present invention, the management server may include: a control support unit for supporting a control manager in decision-making on whether a fire breaks out using a display means; a control supplement unit for supporting a control supplement function for improving accuracy of the decision-making; a remote control supplement unit for supplementing decision-making on whether a fire breaks out through remote support in a situation of no response from the control manager within a set time; a fire notification unit for giving a notification and a warning of fire in a monitoring space and/or a monitoring area where outbreak of a fire is confirmed; a route information providing unit for providing evacuees and suppressors with information set on the optimal fire evacuation route and a fire suppression route; and a fire extinguishing device control unit for operating the smart fire extinguishing device to spurt the extinguishing agent in advance in a corresponding monitoring area.

In an embodiment of the present invention, the control support unit may confirm, from the detection information received through the gateway, which smart fire extinguishing device has detected outbreak of a fire, and generate control information reflecting a confirmation result, and output the control information to the display means.

In an embodiment of the present invention, the control supplement unit may include: a video data collection unit for collecting video data on a monitoring space and/or a monitoring area from a video monitoring device including at least one among a CCTV and a drone; a sensor data collection unit for collecting sensor data through a sensor installed at a location corresponding to an area confirmed through the video data; an information matching unit for matching information on generation of flames and/or smoke confirmed through the video data with generation/continuation of at least one among the temperature, flame, and smoke collected through the sensor data; and a reading verification unit for finally reading whether a fire breaks out as a result of the matching, and performing a control supplement function.

Advantageous Effects

According to an embodiment of the present invention, the smart fire extinguishing device may perform fire extinguishing work by automatically spurting a fire extinguishing agent when outbreak of a fire is detected.

In addition, according to an embodiment of the present invention, the smart fire extinguishing device may spurt a fire extinguishing agent in a set direction and/or range by adjusting arrangement of a plurality of spurt holes and nozzles.

In addition, according to an embodiment of the present invention, the smart fire extinguishing device may improve convenience of decision-making by creating an image of a fire outbreak area by associating map information and/or drawing information of a building structure, and supporting decision-making on whether a fire breaks out using a display means.

In addition, according to an embodiment of the present invention, the smart fire extinguishing device may improve accuracy of fire detection information by correcting a fire detection result by reflecting environmental information on the inside and outside of a fire outbreak area.

In addition, according to an embodiment of the present invention, the smart fire extinguishing device may predict a direction of fire spread, and reduce additional damage caused by fire spread by providing additional control support.

In addition, according to an embodiment of the present invention, the smart fire extinguishing device may increase accuracy of fire detection by matching and verifying sensor data and video data.

In addition, according to an embodiment of the present invention, the smart fire extinguishing device may calculate effective fire evacuation routes and/or fire suppression routes by classifying fire outbreak areas and fire spread areas by associating map information and/or drawing information of a building structure.

In addition, according to an embodiment of the present invention, the smart fire extinguishing device may improve accuracy of predicting fire spread by setting a fire spread area based on a fire class, wind direction, and wind speed.

In addition, according to an embodiment of the present invention, the smart fire extinguishing device may provide differentiated information by classifying personnel in a monitoring area.

In addition, according to an embodiment of the present invention, the smart fire extinguishing device may monitor evacuation routes and fire spread in real-time, set safe evacuation routes and effective suppression routes, and provide the routes to evacuees and/or suppressors.

In addition, according to an embodiment of the present invention, the smart fire extinguishing device may prevent spread of fire by operating the smart fire extinguishing system arranged in a fire spread area.

It should be understood that the effects of the present invention are not limited to the effects described above, and include all effects that can be inferred from the configuration of the invention described in the detailed description or claims of the present invention.

BRIEF DESCRIPTION OF THE DRAWINGS

FIGS. 1 and 2 are views showing the configuration of a smart fire extinguishing device according to an embodiment of the present invention.

FIG. 3 is a view showing the configuration of the fire detection unit of FIG. 2 in detail.

FIG. 4 is a view showing the configuration of the processor of FIG. 3 in detail.

FIG. 5 is a view showing a receiver operating characteristic graph.

FIG. 6 is a view showing a video image acquired by the image acquisition unit of FIG. 4.

FIG. 7 is a view showing a flame candidate area separated from the video image of FIG. 6.

FIG. 8 is a view showing a flame area determined from the flame candidate area of FIG. 6.

FIG. 9 is a view showing a process of generating a histogram by the video processing unit of FIG. 4.

FIG. 10 is a view showing a process of detecting a contour of diffused smoke in the video processing unit of FIG. 4.

FIGS. 11 and 12 are views showing the configuration of a smart fire extinguishing device according to another embodiment of the present invention.

FIG. 13 is a view showing the configuration of a smart fire extinguishing device according to another embodiment of the present invention.

FIG. 14 is a view showing the configuration of a smart fire extinguishing system according to an embodiment of the present invention.

FIG. 15 is a view showing the configuration of the management server of FIG. 14 in detail.

FIG. 16 is a view showing the configuration of the control support unit of FIG. 15 in detail.

FIG. 17 is a view showing the configuration of the control supplement unit of FIG. 15 in detail.

FIG. 18 is a view showing the configuration of the route information providing unit of FIG. 15 in detail.

FIG. 19 is a view showing the configuration of the fire area setting unit of FIG. 18 in detail.

FIG. 20 is a view showing the configuration of the route notification unit of FIG. 18 in detail;

BEST MODE FOR CARRYING OUT THE INVENTION

Hereinafter, the present invention will be described with reference to the accompanying drawings. However, the present invention may be implemented in several different forms, and thus is not limited to the embodiments described herein. In addition, in order to clearly explain the present invention in the drawings, parts unrelated to the description are omitted, and similar reference numerals are attached to similar parts throughout the specification.

Throughout the specification, when a part is "linked (connected, contacted, coupled)" to another part, it includes cases of being "indirectly connected" with intervention of another member therebetween, as well as cases of being "directly connected". In addition, when a part "includes" a certain component, this means that other components may be further provided rather than excluding other components unless otherwise stated.

The terms used in this specification are used only to describe specific embodiments, and are not intended to limit the present invention. Singular expressions include plural expressions unless the context clearly dictates otherwise. It should be understood that in the present specification, terms such as "comprise" or "have" are intended to specify existence of a feature, number, step, operation, component, part, or combination thereof described in the specification, not to preclude the possibility of existence or addition of one or more other features, numbers, steps, operations, components, parts, or combinations thereof.

In the present invention, as a device that can be mounted on a tree or the like to detect fire (forest fire), it is possible to provide a smart fire extinguishing device and a smart fire extinguishing system including the same, which store a fire extinguishing agent (fire extinguishing liquid), and operate (explodes) to spurt and/or scatter the fire extinguishing agent (fire extinguishing liquid) around the device when a fire situation is detected.

In addition, the smart fire extinguishing system of the present invention may interconnect one or more individual smart fire extinguishing devices with each other (individual smart fire extinguishing devices sequentially operate in the direction of fire progress or in a predicted direction of fire progress) through a network, perform remote monitoring on whether one or more individual smart fire extinguishing devices operate for the originally set purpose, the direction of fire progress, and the like from a remote site, and perform a function of informing evacuees and/or suppressors of optimal routes in a disaster situation such as a forest fire.

Hereinafter, an embodiment of the present invention will be described in detail with reference to the accompanying drawings.

FIGS. 1 and 2 are views showing the configuration of a smart fire extinguishing device according to an embodiment of the present invention.

Referring to FIGS. 1 and 2, a smart fire extinguishing device 100 according to an embodiment of the present invention may include, to extinguish forest fire, a chemical storage unit 110 filled with a fire extinguishing agent; a fuse unit 120 for spurting the fire extinguishing agent filled in the chemical storage unit 110 to the outside; a fire detection unit 130 for detecting at least one among temperature, flame, and smoke, determining whether a fire breaks out by comparing a detection result with a preset fire outbreak reference value, and spurting the fire extinguishing agent by operating the fuse unit according to a result of the determination; and a housing 140 for accommodating the chemical storage unit 110, the fuse unit 120, and the fire detection unit 130, and including at least one spurt hole 162 through which the extinguishing agent is spurted.

The chemical storage unit 110 may store a fire extinguishing agent for suppressing fire. At this point, here, the fire extinguishing agent may include all materials used for suppressing fire, and particularly, may include powder, liquid, and/or water slurry for suppressing forest fire. For example, the fire extinguishing agent may contain a fluorinated ketone solution that demonstrates a characteristic of disappearing while taking away heat when it is sprayed in a fire site since it has a density lower than that of the atmosphere and thus rapidly evaporates as soon as contacting fire and smoke while flowing downward.

The fuse unit 120 accommodates gunpowder inside, and a detonator (not shown) ignited by a physical, chemical, or electrical shock may explode the gunpowder, so that the fire extinguishing agent in the chemical storage unit 110 may be spurted out to the outside and scattered. The fuse unit 120 may explode the gunpowder under the control of the fire detection unit 130.

Referring to FIG. 3, the fire detection unit 130 may include: a sensor module 132 for detecting at least one among temperature, flame, and smoke; a wireless communication unit 134 for transmitting detection information of the sensor module 132 to an external device; a processor 136 for controlling the sensor module 132, the wireless communication unit 134, and a power supply unit 138, and determining outbreak of a fire by comparing the detection information of the sensor module 132 with a fire outbreak reference value; and the power supply unit 138 for supplying power to the sensor module 132, the wireless communication unit 134, and the processor 136.

The sensor module 132 may include: at least one among a temperature sensor for sensing temperature, a flame sensor for sensing ultraviolet or infrared rays emitted from flames, a gas sensor for sensing gas including carbon monoxide; a smoke sensor for sensing smoke particles contained in the air; and a video monitoring device for monitoring flames and/or smoke using video detection. The sensor module 132 may transmit detection information to the wireless communication unit 134 and/or the processor 136.

The wireless communication unit 134 may receive video data from an external device (server). Here, the wireless communication unit 134 may use at least one communication method among 3G, Long Term Evolution (LTE), 5G, Beacon, Zigbee, Bluetooth, and Wireless Fidelity (Wi-Fi, a wireless data transmission system), and it is not necessarily limited thereto. For example, the wireless communication unit 134 may communicate with other smart fire extinguishing devices 100 in the neighborhood using a communication protocol such as a Bluetooth Low Energy (BLE) beacon, a Wi-Fi Access Point (AP), Zigbee, or the like.

The wireless communication unit 134 may transmit detection information of the sensor module 132 to an external device. The wireless communication unit 134 may perform wireless communication by covering a distance range of about 100 to 150 m.

The processor 136 may receive a detection result of the sensor module 132, compare it with a preset fire outbreak reference value, and determine outbreak of a fire. For example, when the temperature sensed by the sensor module 132 is about 120 degrees or more, the processor 136 may determine that a fire breaks out by comparing the temperature with a fire outbreak reference value set to about 100 degrees.

In addition, the processor 136 may determine outbreak of a fire, such as generation of flames and/or smoke, on the basis of video analysis of video data received through the wireless communication unit 134.

Referring to FIG. 4, the processor 136 may include: an image acquisition unit 210 for acquiring a video image from the received video data, and dividing the video image into a plurality of blocks; a video processing unit 220 for detecting a flame area and/or a smoke area from the video image divided into the plurality of blocks; and a detection result output unit 230 for calculating areas and/or the number of detected flame areas and/or smoke areas, comparing the calculated areas and/or number of detected flame areas and/or smoke areas with a fire outbreak reference value, and outputting a result of detecting a fire sign as a result of the comparison.

The image acquisition unit 210 may receive video data through the sensor module 132 and/or the wireless communication unit 134, and generate a video image corresponding to a still image from the received video data. In addition, the image acquisition unit 210 may divide the video image into a plurality of preset blocks. At this point, the image acquisition unit 210 may generate a plurality of blocks by dividing the video image into a preset number and/or size.

The video processing unit 220 may detect a flame area and/or a smoke area from the video image according to a set method.

First, a flame area detection method of the video processing unit 220 is described. The video processing unit 220 may detect a flame area from the video image by utilizing YCbCr (sampling frequency ratio of luminance signal and chrominance signal) (Y:luminance, CbCr: color).

More specifically, the video processing unit 220 may convert the video image into a preset color space of YCbCr (sampling frequency ratio of a luminance signal and a chrominance signal) (Y:luminance, CbCr: color). In addition, the video processing unit 220 may remove harmful effects of generating illuminance in the YCbCr color space with reference to Equation 1 shown below.

$$F(x, y) = \begin{cases} 1, & \begin{matrix} \text{if } (Y(x, y) > Y \text{ mean} \\ Cb(x, y) < Cb \text{ mean} \\ Cr(x, y) > Cr \text{ mean} \end{matrix} \\ & 0, \text{ otherwise} \end{cases} \quad \text{[Equation 1]}$$

In addition, the video processing unit 220 may define a point of (x, y) satisfying 1 in Equation 1 as a flame pixel.

$$F_\tau(x, y) = \begin{cases} 1, \text{ if } |Cr(x, y) - Cr(x, y)| \geq \tau \\ 0, \text{ otherwise} \end{cases} \quad \text{[Equation 2]}$$

In Equation 2, τ is a constant and may be determined by ROC (Receiver Operating Characteristics) analysis.

Here, ROC is a graph of hit probability with respect to false alarm probability in the signal detection theory, and as shown in FIG. 5, the bottom-left (0,0) in the ROC graph refers to a delimiter that never says "exist", which may mean that although it does not generate a miss, it also does not mean hit. On the contrary, the top-right (1,1) is a case of saying "exist" unconditionally, and the top-left (0,1) may mean making a perfect distinction. That is, it can be more conservative toward bottom-left and more adventurous toward top-right.

In addition, the video processing unit 220 may finally determine the flame area of FIG. 8 from the flame candidate area by video-processing the flame candidate area after separating the flame candidate area of FIG. 7 from the video image of FIG. 6. Here, the video processing unit 220 finally determines the flame area by analyzing the flame candidate area according to a flame determination reference, and the flame determination reference may be set to include at least one among irregularities observed on a flame surface, roughness of the flame, the amount of change in the flame area, and a tertiary probability moment of the fire area. At this point, the tertiary probability moment may be obtained with reference to Equation 3 shown below.

$$\text{Tertiary moment}=E[(X-\mu)^3]\text{: Skewness} \quad \text{[Equation 3]}$$

Next, describing the method of detecting a smoke area of the video processing unit 220, the video processing unit 220 may detect a smoke candidate area from the video image by applying a random forest classification technique to the video image.

Here, smoke has a characteristic of rising in the atmosphere as it is very light since the particle size is 0.1 to 1 μm, and is white, gray, or black, and it is desirable to detect the smoke using three characteristics of brightness, motion accumulation, and diffusion. In addition, since outdoor smoke is greatly affected by external environmental variables, it is desirable to apply a random forest classification technique.

More specifically, the video processing unit 220 may set a block of the smoke candidate area equal to or greater than a detection reference value as a region of interest by comparing continuously captured video images. In addition, the video processing unit 220 may learn different random forests for a plurality of regions of interest, and generate a cumulative probability histogram by accumulating classes generated as a result of the learning as shown in FIG. 9. In addition, the video processing unit 220 may finally determine the smoke area from the generated histogram. Through this, the video processing unit 220 may detect the contour of the diffused smoke as shown in FIG. 10.

In addition, the random forest is an ensemble method for learning a plurality of decision trees, which is a method of constructing a forest based on uncorrelated trees using a classification and regression tree (CART) such as a method that combines randomized node optimization and bootstrap aggregating bagging. Such a random forest may have characteristics such as high accuracy, a convenient and fast learning and testing algorithm, generalization through randomization, and the like.

The detection result output unit 230 may calculate the block area and/or the number of blocks of the detected flame area and/or smoke area, compare the calculated block area and/or the number of blocks of the flame area and/or the smoke area with a fire outbreak reference value, and output a result of determining outbreak of a fire when the block area and/or the number of blocks is greater than the fire outbreak reference value.

At this point, the processor 136 may read a previously set and/or stored fire outbreak reference value and determine outbreak of a fire in response to a detection result (temperature, flame, smoke) of the sensor module 132 and the calculated block area and/or the number of blocks of the flame area and/or the smoke area.

The processor 136 may operate the fuse unit 120 to spurt the fire extinguishing agent on the basis of the result of determining outbreak of a fire.

In addition, when fire detection information of the sensor module 132 is received, the processor 136 may change the fire detection unit 130 from a standby mode (sleep mode) to an active mode. For example, when fire detection information is received from the sensor module 132 while the standby mode (sleep mode) is maintained in normal times, the processor 136 may change the power mode of the power supply unit 138 to the active mode, and transmit the detection information to other smart fire extinguishing devices 100 in the neighborhood through the wireless communication unit 134.

The power supply unit 138 may be switched from a standby mode to an active mode under the control of the processor 136 to supply power to the sensor module 132, the wireless communication unit 134, and the processor 136. The power mode of the power supply unit 138 includes a standby mode and an active mode. The standby mode may correspond to a low-power mode, and the active mode may correspond to a relatively high-power mode.

Here, the standby mode may be a mode that consumes power as low as to detect a fire by the smart fire extinguishing device 100 or to receive detection information transmitted from other smart fire extinguishing devices 100 in the neighborhood. In addition, the active mode may be a high-power mode in which the wireless communication unit 134 is activated and transmits a signal to the smart fire extinguishing devices 100 in the neighborhood. The power supply unit 138 like this may include a power storage device. For example, the power supply unit 138 may include a power storage device including a battery that can be used for about 6 to 8 months, a solar cell using solar heat, a battery using a piezoelectric element, a battery using a magnetic field, and the like. At this point, the power supply unit 138 may further extend the use time by adding a battery of the power storage device, and may adjust the use time by managing the capacity and/or the number of batteries.

Referring to FIGS. 1 and 2 again, the housing 140 may include a first accommodation unit 150 for accommodating the chemical storage unit 110 and/or the fuse unit 120, and a second accommodation unit 160 connected to the first accommodation unit 150 and provided with nozzles 164 that connect the spurt holes 162 and the chemical storage unit 110 and provide a moving passage of the extinguishing agent.

Here, in the housing 140, the second accommodation unit 160 is formed in a spherical shape surrounding the first accommodation unit 150, and a plurality of spurt holes 162 may be arranged on the surface of the second accommodation unit 160.

In addition, the housing 140 may include a mounting member 170 for mounting the smart fire extinguishing device 100 between trees. Here, the mounting member 170 may include at least one among a belt, a string, a loop, and an elastic body connecting the trees and the housing 140. The housing 140 is mounted between the trees to spurt the fire extinguishing agent in all directions of 360 degrees through the plurality of spurt holes 162.

FIGS. 11 and 12 are views showing a smart fire extinguishing device according to another embodiment of the present invention.

Here, for convenience, only the parts different from those of the smart fire extinguishing device shown in FIGS. 1 and 2 will be described in detail.

Referring to FIGS. 11 and 12, the smart fire extinguishing device 100 according to another embodiment of the present invention includes: a chemical storage unit 110 filled with a fire extinguishing agent; a fuse unit 120 disposed on the bottom of the chemical storage unit 110 to spurt the fire extinguishing agent filled in the chemical storage unit 110 to the outside; a fire detection unit 130 for detecting at least one among temperature, flame, and smoke, determining whether a fire breaks out by comparing a detection result with a preset fire outbreak reference value, and spurting the fire extinguishing agent by operating the fuse unit according to a result of the determination; and a housing 140 for accommodating the chemical storage unit 110, the fuse unit 120, and the fire detection unit 130, and including at least one spurt hole 162 through which the extinguishing agent is spurted.

The housing 140 may include a first accommodation unit 150 for accommodating the chemical storage unit 110, the fuse unit 120, and the fire detection unit 130, and a second accommodation unit 160 coupled to the top of the first accommodation unit 150 and having a plurality of spurt holes 162 in a set direction.

As shown in FIG. 12, the second accommodation unit 160 may be formed to have a vertical cross-section of an inverted trapezoidal shape, and a plurality of spurt holes 162 may be arranged on the top surface. In addition, the second accommodation unit 160 may include a plurality of nozzles 164 connecting the chemical storage unit 110 and the plurality of spurt holes 162.

Each of the plurality of nozzles 164 may be formed to maintain or gradually vary the diameter from one side connected to the chemical storage unit 110 to the other side connected to the spurt holes 162 according to embodiments. In addition, as each of the plurality of nozzles 164 connects the chemical storage unit 110 and the plurality of 162, it may be inclined as much as a preset angle with respect to the center line perpendicular to the bottom surface of the second accommodation unit 160.

The second accommodation unit 160 may arrange the plurality of spurt holes 162 and the plurality of nozzles 164 according to the spurt direction and/or spurt range of the fire extinguishing agent. Through this, the smart fire extinguishing device 100 may spurt the extinguishing agent in a preset direction and/or range by predicting a spread direction and/or range of fire.

FIG. 13 is a view showing a smart fire extinguishing device according to another embodiment of the present invention.

Here, for convenience, only the parts different from those of the smart fire extinguishing device shown in FIGS. 1 and 2 will be described in detail.

Referring to FIG. 13, the smart fire extinguishing device 100 according to another embodiment of the present invention may include a plurality of second accommodation units 160 coupled to the first accommodation unit 150.

Here, each of the plurality of second accommodation units 160 may be coupled in a plurality of directions of the first accommodation unit 150. For example, each of two second accommodation units 160 may be coupled in two directions of the first accommodation unit 150 facing each other.

The smart fire extinguishing device 100 may combine a desired number of second accommodation units 160 having a plurality of spurt holes 162 to the first accommodation unit 150 according to a desired spurt direction and/or spurt range, and may spurt the extinguishing agent into the plurality of second accommodation units 160 using one fuse unit 120. Through this, the smart fire extinguishing device 100 may predict a spread direction and/or range of fire, and spurt the extinguishing agent in a desired direction and/or range.

FIG. 14 is a view showing the configuration of a smart fire extinguishing system according to an embodiment of the present invention.

Referring to FIG. 14, the smart fire extinguishing system according to an embodiment of the present invention may include: at least one smart fire extinguishing device 100 arranged in a set monitoring area to detect fire and perform fire extinguishing work; a gateway 300 for receiving and/or collecting detection information from the smart fire extinguishing devices 100 and transmitting the detection information to an external device; and a management server 400 for receiving the detection information of the smart fire extinguishing device 100 for each monitoring area, generating control information, and notifying the control information to the manager.

Since the detailed configuration of the smart fire extinguishing device 100 has been described with reference to FIG. 1, duplicate descriptions will be omitted here for convenience.

The smart fire extinguishing device 100 may be arranged at predetermined intervals in each monitoring area to configure a Wireless Mesh Network (WMN). In addition, the smart fire extinguishing device 100 may transmit detection information to other adjacent smart fire extinguishing devices 100 and/or the gateway 300 through the wireless mesh network.

The gateway 300 may receive the detection information from the smart fire extinguishing device 100 through the wireless mesh network, collect the received detection information, and transmit the detection information to the management server 400.

Here, in the smart fire extinguishing devices 100-1, 100-2, 100-3, and 100-N (N is a natural number) constituting the wireless mesh network (WMN), when the sensor module 132 and/or the processor 136 of the smart fire extinguishing device 100-1 detects a fire, the processor 136 of the smart fire extinguishing device 100-1 may change the power mode of the smart fire extinguishing device 100-1, and transmit detection information to the smart fire extinguishing device 100-2 in the neighborhood. In addition, although the smart fire extinguishing device 100-2 does not directly detect sediment, it may receive a signal including the detection information from the wireless communication unit 134 of a sediment detection unit 210-1, and change the power mode to the active mode and transmit the detection information to another smart fire extinguishing device 100-3 in the neighborhood.

These smart fire extinguishing devices 100-1, 100-2, 100-3, and 100-N may implement the wireless mesh network (WMN) in an ad-hoc routing method. For example, when the smart fire extinguishing device 100-1 detects a fire and is switched from the standby mode to the active mode, it may transmit detection information such as activation time, node information, and the like to the adjacent smart fire extinguishing device 100-2. Through this, the smart fire extinguishing system according to an embodiment of the present invention may reduce the components and cost of the device since signals are collected and exchanged through the gateway 300, rather than one-to-one communication of the smart fire extinguishing device 100 with the management server 400. In addition, since the smart fire extinguishing system according to an embodiment of the present invention consumes less power, the maintenance term of the system is long, and follow-up management of the system may be convenient.

Referring to FIG. 15, the management server 400 may include: a control support unit 410 for supporting a control manager in decision-making on whether a fire breaks out using a display means; a control supplement unit 420 for supporting a control supplement function for improving accuracy of the decision-making; a remote control supplement unit 430 for supplementing decision-making on whether a fire breaks out through remote support in a situation of no response from the control manager within a set time; a fire notification unit 440 for giving a notification and a warning of fire in a monitoring space and/or a monitoring area where outbreak of a fire is confirmed; a route information providing unit 450 for providing evacuees and suppressors with information set on optimal fire evacuation routes and fire suppression routes; and a fire extinguishing device control unit 460 for operating the smart fire extinguishing device 100 to spurt the extinguishing agent in advance in a corresponding monitoring area.

When the smart fire extinguishing device 100 detects outbreak of a fire, the control support unit 410 may generate visualized control information using a result of detecting outbreak of a fire, and transmit the control information to the control terminal of the control manager working in the field and/or control room to notify to display the control information as a pop-up notification and/or sound output on the control terminal. For example, the control support unit 410 may receive detection information (fire detection result) through the gateway 300, confirm, from the detection information, which fire outbreak area and/or smart fire extinguishing device 100 has detected outbreak of a fire (abnormal situation), generate control information reflecting a confirmation result, and output the control information to the display means.

At this point, the control support unit 410 may support control of fire outbreak so that the control manager may inform and warn the field more effectively after finally reviewing the visualized fire outbreak area through the pop-up window of the control terminal. That is, the control support unit 410 may support the control manager to confirm outbreak of a fire through a decision-making support system.

To this end, referring to FIG. 16, the control support unit 410 may include: a monitoring area image generation unit 411 for generating a two-dimensional or three-dimensional area image based on information on the location where outbreak of a fire is detected by reflecting map information and/or drawing information of a building structure; a detection result correction unit 413 for receiving environmental information of any one or more among illuminance, temperature, humidity, wind direction, and wind speed of the area through a weather information sensor installed in the monitoring area, and correcting the fire detection result; and a fire spread information generation unit 415 for calculating and additionally generating a neighboring area, in which spread of fire within a set time is expected, through the monitoring area based on the fire detection result and the environmental information.

When the smart fire extinguishing device 100 detects outbreak of a fire, the control supplement unit 420 may perform a control supplement function to improve accuracy of decision-making on whether a fire breaks out. To this end, referring to FIG. 17, the control supplement unit 420 may include: a video data collection unit 421 for collecting video data on a monitoring space and/or a monitoring area from a video monitoring device including a CCTV, a drone, or the like; a sensor data collection unit 423 for collecting sensor data through a sensor installed at a location corresponding to an area confirmed through the video data; an information matching unit 425 for matching information on generation of flames and/or smoke confirmed through the video data with generation/continuation of at least one among the temperature, flame, and smoke collected through the sensor data; and a reading verification unit 427 for finally reading whether a fire breaks out as a result of the matching, and performing a control supplement function.

The video data collection unit 4210 may receive video data from a video monitoring device, for example, a CCTV installed in a set area, or a drone mounting a camera and flying to a target point.

Here, the information matching unit 425 may perform at least any one matching function among a first matching function of reading whether flames are generated by matching video data on generation of the flames with first sensor data on the flames; a second matching function of reading whether smoke is generated by matching video data on generation of the smoke with second sensor data on the smoke; and a third matching function of sensing temperature by matching video data on the temperature with third sensor data on the temperature.

The control supplement unit 420 increases accuracy of determination on whether a fire breaks out in a corresponding area by comprehensively analyzing the sensor data and/or video data collected through the smart fire extinguishing device 100 and the video data collected through the video monitoring device to more accurately detect and read whether a fire breaks out.

The remote control supplement unit 430 may support to supplementally confirm whether a fire breaks out through remote support in a situation where additional responses are required, such as when there is no response from the field and/or control room within a set time. When decision-making on whether a fire breaks out is not processed in the field and/or control room during a set time according to a situation, the remote control supplement unit 430 may support to process the decision-making on whether a fire breaks out through remote support in order to quickly cope with the fire.

For example, the remote control supplement unit 430 may notify a result of detecting fire signs to the control terminal and/or mobile terminal of a supervisor and/or a colleague of the control manager, and then receive and process an input of decision-making on whether a fire breaks out through remote support. In addition, when the control manager is not in the field and/or control room, the remote control supplement unit 430 may notify a result of detecting the fire signs to the portable terminal, as well as the control terminal, and then receive and process an input of decision-making on whether a fire breaks out through remote support.

The fire notification unit 440 may give a notification and/or a warning of outbreak of fire in a monitoring area and/or a monitoring space, and support follow-up measures such as fire evacuation, fire extinguishing work, and the like. For example, the fire notification unit 440 may transmit a fire alarm notification broadcast using a speaker or turn on a fire alarm lamp using a lighting device.

Referring to FIG. 18, the route information providing unit 450 may include: a fire area setting unit 451 for distinguishing a fire outbreak area and/or a fire spread area; a fire warning unit 452 for transmitting a warning broadcast and/or turning on a warning emergency lamp; and a route notification unit 453 for calculating fire evacuation routes and/or fire suppression routes, and selectively informing evacuees and/or suppressors of the fire evacuation routes and/or the fire suppression routes.

Referring to FIG. 19, the fire area setting unit 451 may include: a fire outbreak area image generation unit 451-1 for generating an image of a two-dimensional or three-dimensional area on the basis of information on a location corresponding to a fire outbreak area by reflecting map information and/or drawing information of a building structure; and a fire spread area setting unit 451-3 for calculating fire classes of the fire outbreak area and an area located in the neighborhood of the fire outbreak area, and/or additionally creating a fire spread area in which spread of fire within a set time through the fire outbreak area is expected on the basis of wind direction and/or wind speed information affecting the fire outbreak area and the area located in the neighborhood of the fire outbreak area, and classifying the fire outbreak area and the fire spread area.

The fire warning unit 452 may transmit a broadcast signal to output a warning broadcast using a speaker, or a lighting signal to turn on a warning emergency lamp using a warning display device.

The route notification unit 453 may provide evacuees and suppressors with visualized information about optimal fire evacuation routes and fire suppression routes when a fire breaks out. To this end, referring to FIG. 20, the route notification unit 453 may include: an evacuation route generation unit 453-1 for generating at least one fire evacuation route on the basis of moving passage information of a building structure including fire outbreak area information (image), fire spread area information (image), a fire outbreak area, and a fire spread area; a suppression route generation unit 453-3 for generating at least one fire suppression route on the basis of moving passage information of map information including fire outbreak area information (image), fire spread area information (image), a fire outbreak area, and a fire spread area; a personnel characteristic analysis unit 453-5 for confirming whether personnel located in a fire spread area are evacuees or suppressors; and a route recommendation unit 453-7 for recommending an evacuation route when the personnel are evacuees or a suppression route when the personnel are suppressors.

The route notification unit 453 may provide fire evacuation routes and/or fire suppression routes by setting a display color and/or a blinking pattern of a previously installed route display device.

Meanwhile, the route information providing unit 450 may further include: an evacuation route monitoring unit 455 for monitoring evacuation status of evacuees through a set evacuation route; an evacuation risk monitoring unit 456 for confirming, in real-time according to fire spread prediction information, whether the evacuation route and the fire spread area overlap in real-time and/or within a set time; and an evacuation route re-setting unit 457 for re-setting the evacuation route when the evacuation route and the fire spread area are expected to overlap.

Referring to FIG. 15 again, the fire extinguishing device control unit 460 may spurt the fire extinguishing agent into a corresponding monitoring area in advance by operating the smart fire extinguishing device 100 disposed in a fire spread area on the basis of map information including fire outbreak area information (image), fire spread area information (image), a fire outbreak area, and a fire spread area.

In addition, when it is determined that a fire breaks out, the fire extinguishing device control unit 460 may control in which area (section) the smart fire extinguishing devices 100 will operate among the plurality of smart fire extinguishing devices 100.

Through this, the fire extinguishing device control unit 460 may operate the smart fire extinguishing devices 100 to extinguish fire in the early stage when a fire breaks out, and prevent the fire from spreading to the fire spread area by performing early control of fire spread in a way of preemptively spurting the fire extinguishing agent.

The smart fire extinguishing system according to an embodiment of the present invention may improve convenience of decision-making by creating an image of a fire outbreak area by associating map information and/or drawing information of a building structure, and supporting decision-making on whether a fire breaks out using a display means.

In addition, the smart fire extinguishing system according to an embodiment of the present invention may improve accuracy of fire detection information by correcting a fire detection result by reflecting environmental information on the inside and outside of a fire outbreak area.

In addition, the smart fire extinguishing system according to an embodiment of the present invention may predict a direction of fire spread, and reduce additional damage caused by fire spread by providing additional control support.

In addition, the smart fire extinguishing system according to an embodiment of the present invention may increase accuracy of fire detection by matching and verifying sensor data and video data.

In addition, the smart fire extinguishing system according to an embodiment of the present invention may calculate effective fire evacuation routes and/or fire suppression routes by classifying fire outbreak areas and fire spread areas by associating map information and/or drawing information of a building structure.

In addition, the smart fire extinguishing system according to an embodiment of the present invention may improve accuracy of predicting fire spread by setting a fire spread area based on a fire class, wind direction, and wind speed.

In addition, the smart fire extinguishing system according to an embodiment of the present invention may provide differentiated information by classifying personnel in a monitoring area.

In addition, the smart fire extinguishing system according to an embodiment of the present invention may monitor evacuation routes and fire spread in real-time, set safe evacuation routes and effective suppression routes, and provide the routes to evacuees and/or suppressors.

In addition, the smart fire extinguishing system according to an embodiment of the present invention may prevent spread of fire by operating the smart fire extinguishing system arranged in a fire spread area.

The description of the present invention described above is for illustration, and those skilled in the art may understand that it can be easily modified into other specific forms without changing the technical spirit or essential features of the present invention. Therefore, it should be understood that the embodiments described above are illustrative in all respects and not restrictive. For example, each component described as a single type may be implemented in a distributed form, and components described as distributed may also be implemented in a combined form likewise.

The scope of the present invention is indicated by the following claims, and all changes or modifications derived from the meaning and scope of the claims and their equivalents should be construed as being included in the scope of the present invention.

The invention claimed is:

1. A smart fire extinguishing device comprising:

a chemical storage configured to have therein a fire extinguishing agent;

a fuse unit exhibiting to have an explosive force to spurt the fire extinguishing agent in the chemical storage to an outside; and a fire detector configured to detect temperature, flame, and smoke, determine whether a fire has occurred by comparing a result of detection of the temperature, flame, and smoke with a preset fire outbreak reference value, and spurt the fire extinguishing agent by operating the fuse unit according to a result of determination of whether the fire has occurred, wherein the fire detector includes:

a sensor module configured to detect the temperature, flame, and smoke and flame; and a processor configured to determine whether the fire has occurred by comparing detection information of the sensor module with the preset fire outbreak reference value, wherein the processor includes:

an image acquisition unit to acquire a video image from a video data and divide the video image into a plurality of blocks;

a video processing unit to detect at least one flame area and at least one smoke area from the video image divided into the plurality of blocks; and a detection result output unit to calculate areas of the at least one flame area and the at least one smoke area and/or a number of the at least one flame area and the at least one smoke area, compare the calculated areas and/or the number of the at least one flame area and the at least one smoke area with the preset fire outbreak reference value, and output the result of the determination of whether the fire has occurred as a result of the comparison, wherein the video processing unit is configured to detect the at least one smoke area by:

setting the plurality of blocks of the video image that has a reference value of brightness, motion accumulation, and diffusion of the smoke that is equal to or greater than a predetermined reference value as a plurality of regions of interest, learning a plurality of random forests for the plurality of regions of interest, respectively, using a random forest classification technique, and generating a cumulative probability histogram by accumulating classes generated as a result of the learning.

2. The smart fire extinguishing device according to claim 1, wherein the fire detector further includes:

a wireless communication unit to transmit the detection information of the sensor module to an external device; and a power supply configured to supply power to the sensor module, the wireless communication unit, and the processor, wherein the processor is further configured to control the sensor module, the wireless communication unit, and the power supply.

3. The smart fire extinguishing device according to claim 2, wherein the sensor module includes at least one of a temperature sensor to sense temperature, a flame sensor to sense ultraviolet and/or infrared rays emitted from flames, a gas sensor to sense gas including carbon monoxide, a smoke sensor to sense smoke particles contained in an air, and a video monitoring device to monitor flames and/or smoke using video detection.

4. The smart fire extinguishing device according to claim 2, wherein when the sensor module detects the temperature, flame, and smoke, the processor is configured to change an operation mode of the power supply unit from a standby mode to an active mode and transmit the detection information to other fire detectors disposed within a predetermined distance, and wherein the detection information includes node information of the fire detector and time information about when the wireless communication unit is activated.

5. The smart fire extinguishing device according to claim 1, wherein the smart fire extinguishing device includes a housing for accommodating the chemical storage, the fuse unit, and the fire detector, the housing including at least one spurt hole configured to spurt therethrough the fire extinguishing agent stored in the chemical storage.

6. The smart fire extinguishing device according to claim 5, wherein the housing includes:

a first accommodation unit for accommodating the chemical storage and/or the fuse unit; and a second accommodation unit connected to the first accommodation unit, the second accommodation unit having a nozzle that connects the at least one spurt hole and the chemical storage, the nozzle being configured to provide a moving passage of the fire extinguishing agent.

* * * * *